(12) United States Patent
Matias

(10) Patent No.: US 7,311,455 B2
(45) Date of Patent: Dec. 25, 2007

(54) KEYBOARD FOR MINIMIZING NON-PRODUCTIVE HAND MOVEMENTS

(75) Inventor: Edgar Matias, Vaughan (CA)

(73) Assignee: Matias Corporation, Vaughan, Ontario (CA)

( * ) Notice: Subject to any disclaimer, the term of this patent is extended or adjusted under 35 U.S.C. 154(b) by 0 days.

(21) Appl. No.: 10/912,144

(22) Filed: Aug. 6, 2004

(65) Prior Publication Data

US 2006/0029452 A1 Feb. 9, 2006

(51) Int. Cl.
*B41J 5/00* (2006.01)
(52) U.S. Cl. .............. 400/486; 400/476; 400/477; 400/489; 400/472
(58) Field of Classification Search .......... 400/472
See application file for complete search history.

(56) References Cited

U.S. PATENT DOCUMENTS

| | | | |
|---|---|---|---|
| 4,552,518 A | 11/1985 | Utter | |
| 4,974,183 A | 11/1990 | Miller | |
| 5,287,526 A | 2/1994 | Wolf et al. | |
| 5,360,280 A * | 11/1994 | Camacho et al. | 400/489 |
| D354,049 S | 1/1995 | Baitinger et al. | |
| 5,880,685 A * | 3/1999 | Weeks | 341/22 |
| 6,043,809 A | 3/2000 | Holehan | |
| 6,198,474 B1 | 3/2001 | Roylance | |
| 6,320,519 B1 | 11/2001 | Hsu et al. | |
| D458,258 S | 6/2002 | Hayes et al. | |
| 6,682,235 B2 | 1/2004 | Monney et al. | |
| 6,712,535 B2 * | 3/2004 | McLoone et al. | 400/489 |
| 6,862,017 B2 * | 3/2005 | Chen | 345/168 |
| 6,965,372 B1 * | 11/2005 | Woods | 345/168 |
| 2003/0030625 A1 * | 2/2003 | Kauk et al. | 345/169 |

* cited by examiner

*Primary Examiner*—Daniel J. Colilla
*Assistant Examiner*—Marissa Ferguson-Samreth
(74) *Attorney, Agent, or Firm*—Perry + Currier

(57) ABSTRACT

A typing keyboard is provided for minimizing non-productive hand movements. The keyboard comprises a plurality of keys for entering alphanumeric text, the keys being positioned according to a conventional keyboard layout, and at least one modifier key for assigning commonly-used keyboard functions to predetermined ones of the keys positioned near a normal resting position of a user's typing fingers.

14 Claims, 6 Drawing Sheets

KEYBOARD FOR MINIMIZING NON-PRODUCTIVE HAND MOVEMENTS

BACKGROUND OF THE INVENTION

1. Field of the Invention

The present invention relates generally to alphanumeric keyboards, and more specifically to an improved keyboard for minimizing non-productive hand movements.

2. Description of the Related Art

Over the years, computer keyboards have evolved into a limited number of standard models, based on general user perception of benefits versus compromises. These generally available standard keyboards amount to the lowest common denominators that generally satisfy the majority of users' needs. Nonetheless, research in keyboard design continues in an attempt to improve on the most significant shortcomings of existing models.

U.S. Pat. No. 6,682,235 discloses a popular desktop keyboard having a scroll wheel on the left side and editing keys in standard locations. A user can move his/her hands off of the home row keys (from the letter "a" to the apostrophe) as required, in order to access the editing keys. The keyboard also has navigation functions accessible on a number pad. However, since the "num lock" actuator for engaging these functions is not conveniently accessible, the navigation functions are rarely used. Instead, users tend to move their hands back and forth between cursor/edit keys and the number pad.

U.S. Pat. No. Des. 458,258 shows a keyboard that is known commercially as the "Microsoft Office Keyboard". It was designed to address the needs of Microsoft Office users, and has dedicated Cut, Copy, Paste keys and a scroll wheel on the left side. While convenient, these features still require users to move their hands off of the home row keys in order to access the Cut, Copy, and Paste keys and the scroll wheel. As a result of incorporating these extra keys as well as an integrated wrist rest, the keyboard is also very large, occupying significantly more desk real estate than a standard keyboard. Number pad navigation on the "Microsoft Office Keyboard" keyboard is the same as with the keyboard set forth in U.S. Pat. No. 6,682,235.

The practice of using an additional modifier key (Fn) to remap selected keys on compact keyboards is widespread in the industry. This technique allows a small keyboard to reproduce the functionality of a large one, without a corresponding increase in size.

U.S. Pat. No. Des. 354,049 sets forth a representative example of a keyboard design commonly used in laptop computers. A modifier (Fn) key allows the user to remap the right side of the keyboard to a numeric keypad. However, home row position for the resulting virtual number pad is one row higher than the home row position for typing text, with the result that hand re-positioning is required in order to switch back and forth between numeric and text entry. Navigation and editing functions also require movement of the hand(s) off of home row.

The commercially available Happy Hacking Keyboard™ manufactured by PFU Systems, Inc., of Santa Clara, Calif., uses the Fn key method to provide navigation and editing features to the right hand. However, the available Fn keys are not in the home row, with the result that awkward hand movements are sometimes required. Also, the navigation and editing keys are in arbitrary positions that do not map well to the standard home-row positions for controlling these keys, thereby contributing to extra learning time/effort to be exerted the user.

U.S. Pat. No. 5,287,526 discloses a complicated mechanism for using non-modifier keys to function as modifier keys, thereby allowing the rest of the keyboard layout to be remapped at will. This approach is problematic for several reasons: (1) In order to detect the operator's intention, the key acting as a modifier needs to be held down for a set length of time. This pause slows the user down, thereby interrupting work flow. (2) Slow typists will unintentionally trigger the alternate layout, resulting in unpredictable keyboard behavior. (3) The keys acting as modifier keys lose the ability to auto repeat. This can be especially problematic if the Space bar is used as the modifier key (one of the preferred embodiments set forth in the patent). Since the Space bar key is used so frequently during normal typing, impairing its functionality can significantly degrade typing performance. (4) The layouts disclosed show the left hand assigned to cursor control, which is contrary to standard practice. Virtually all keyboards have the right hand controlling the cursor keys. This also conflicts with the known finger-to-key mapping of a standard "inverted-T" cursor pod (i.e. the keys obtained by typing with the index and ring fingers are swapped). This may cause problems and further confuse the user. (5) The embodiments disclosed are limited to compact keyboards only. There is no discussion of how the keyboard would interact with a mouse (or other pointing device), or of enhancing the functionality of the number pad. Moreover, U.S. Pat. No. 5,287,526 advocates eliminating the standard number pad and navigation keys entirely, as a means of reducing manufacturing costs.

U.S. Pat. No. 6,198,474 discloses techniques similar to those described in U.S. Pat. No. 5,287,526 (discussed above), with the same goal of reducing keyboard size. All standard modifier keys are removed and functionally is replaced by a Space bar that is split into two parts, with different modifier functions being assigned to each half. However, the procedure for reproducing the lost modifier keys is complicated and the resulting layout is largely arbitrary, bearing no resemblance to any standard keyboard layout. This results in considerable user effort to learn how to type with the keyboard, resulting in many of the shortcomings discussed above in reference to U.S. Pat. No. 5,287,526.

U.S. Pat. Nos. 4,974,183 and 4,522,518 disclose similar methods for reducing hand movement. Each discloses a keyboard that is split in the centre, with additional keys being placed between the two sides. Additional keys below the Space bar area are also contemplated. Unfortunately, users of these keyboards still need to move their hands in order to reach the additional keys and in some cases, the positioning may not be intuitive. Both keyboards have non-standard designs, which require expensive custom manufacturing. Deviating from the standard layout also makes these keyboards less attractive to conservative consumers.

U.S. Pat. No. 6,043,809 describes the addition of scroll bar sensors to various straight areas of a standard keyboard. By running a finger along one of these strips, the operator is able to scroll through a document (vertically or horizontally) using either hand.

SUMMARY OF THE INVENTION

According to the present invention, an improved keyboard is provided that is more efficient to use than the prior art models set forth above. More particularly, the keyboard of the present invention incorporates a strategically-positioned dedicated modifier key (Fn) and assigns commonly-used keyboard functions to positions that are fast and easily typed, such that the user performs fewer unproductive hand movements when compared to a standard computer keyboard designs.

BRIEF DESCRIPTION OF THE DRAWINGS

A detailed description of the invention is set forth herein below, with reference to the following drawings, in which:

FIG. 2, comprising

DETAILED DESCRIPTION OF THE PREFERRED EMBODIMENTS

In all of the Figures, certain keys are not labeled (e.g. other modifier keys). A person of ordinary skill in the art will appreciate that these keys may or may not be used in combination with the keys shown in the Figures.

Figure 1:
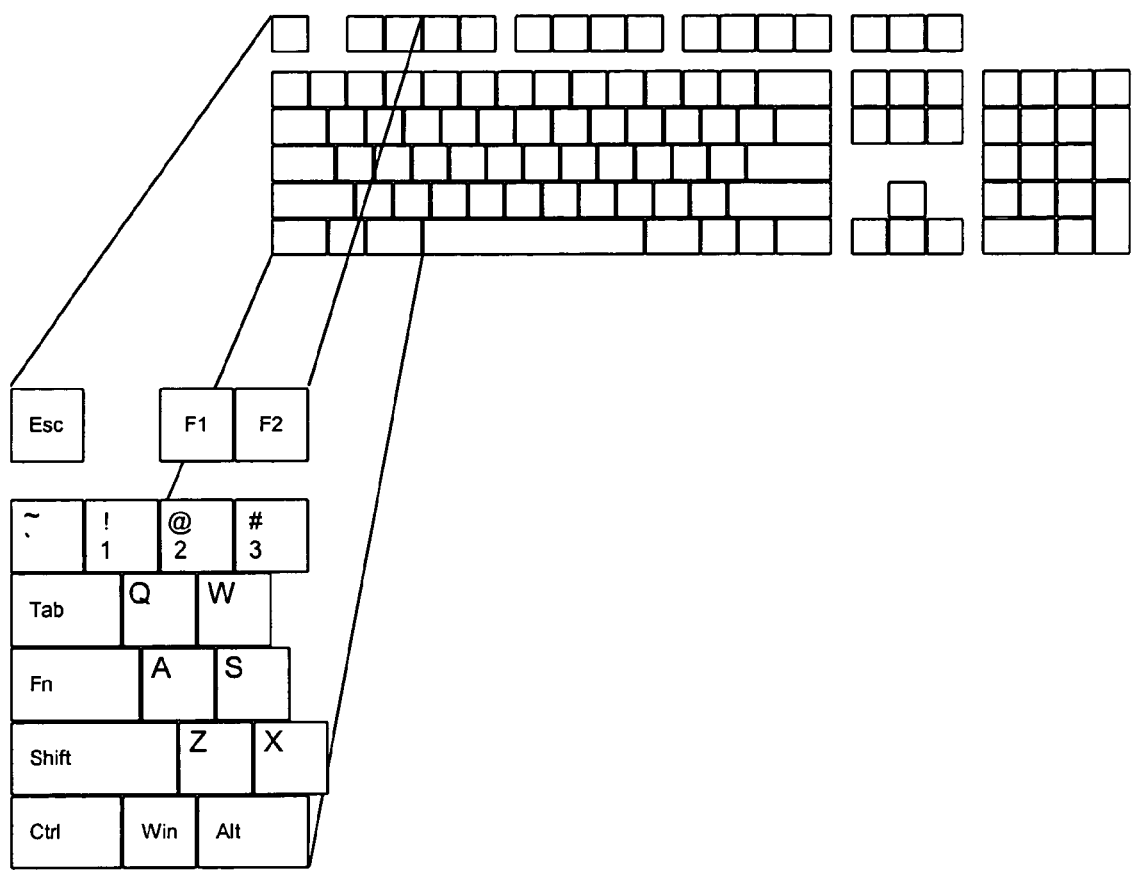
FIG. 1 shows a keyboard layout according to the present invention, with a modifier (Fn) key strategically positioned for optimal use.

According to the present invention, a modifier key (Fn) is located at a position on (or within easy reach of) the home row of keys. Preferably, as shown in FIG. 1, the Fn key is located on the left side of the keyboard, between the Tab and Shift keys. This is the standard position for the Caps Lock key, which would have to be re-located to any available location.

When the Fn key is pressed (activated), the keyboard remaps to an alternate layout, as discussed in greater detail below. When the Fn key is released (de-activated), the keyboard returns to its standard layout.

Figure 2A:
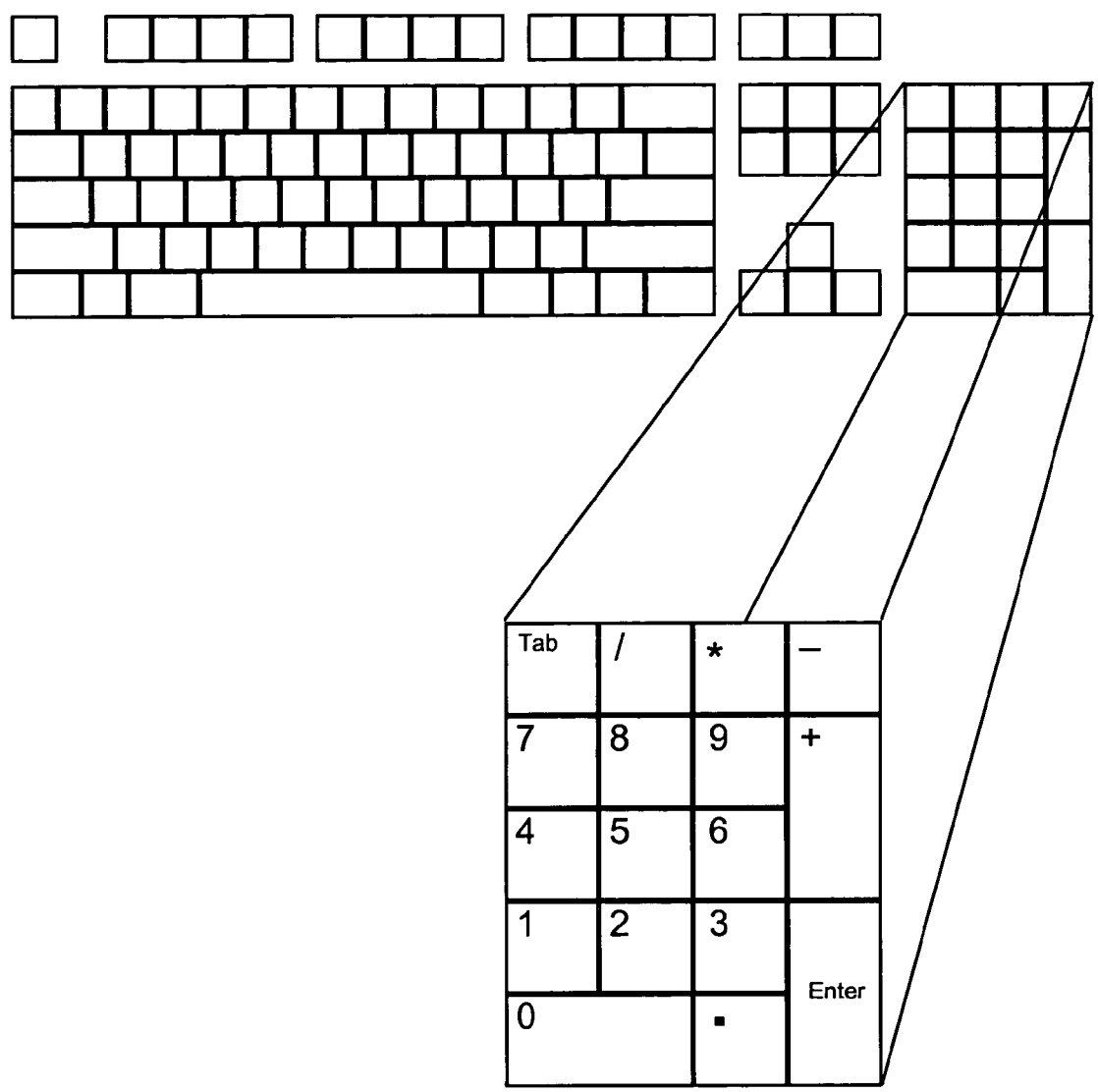
FIGS. 2a and 2b, shows the keyboard layout of a conventional numeric keypad (FIG. 2a) and an alternate layout (FIG. 2b) that becomes active when the Fn of FIG. 1 is pressed and held.
Figure 2B:
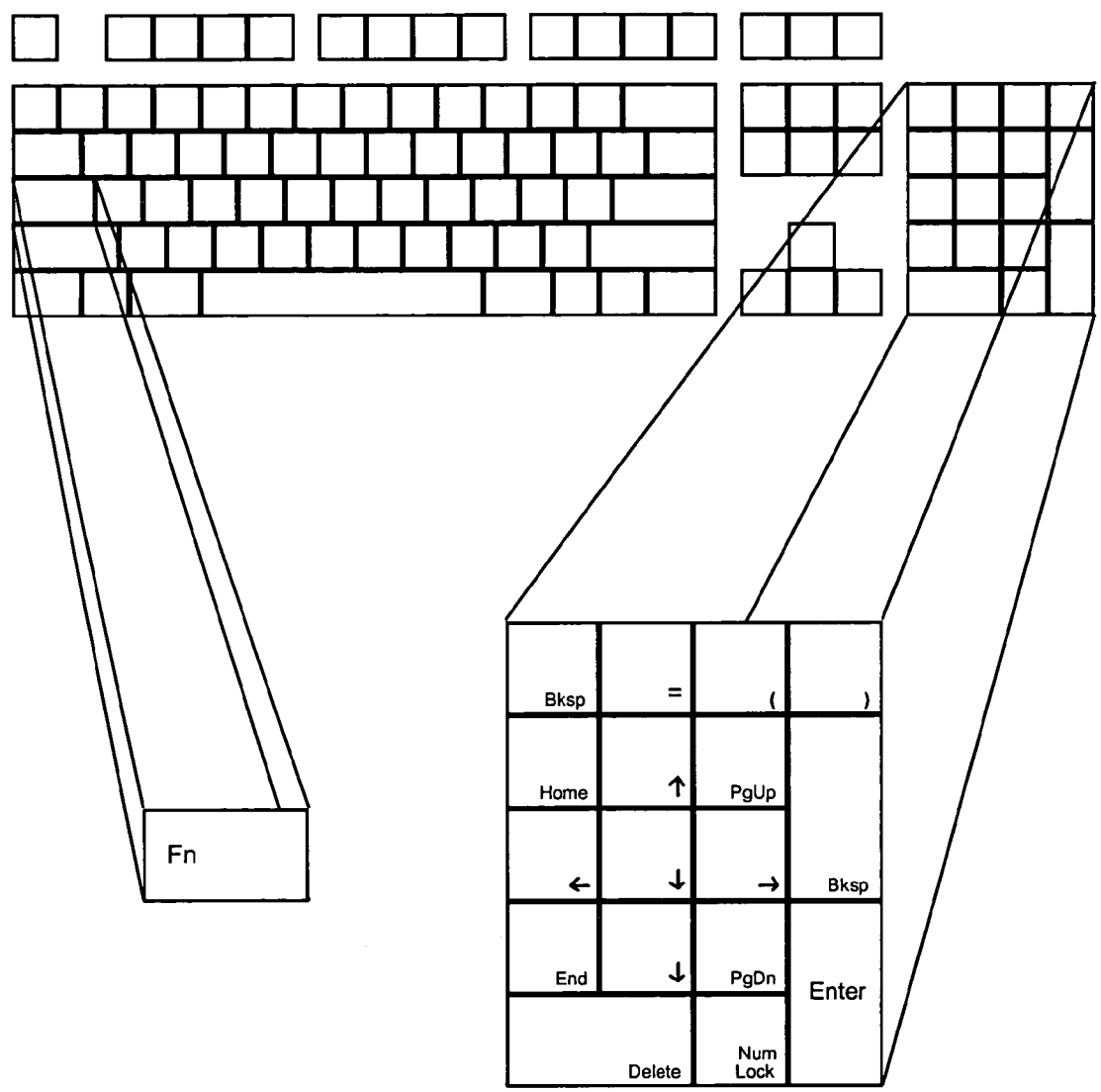

FIG. 2 shows an embodiment optimized for use with a numeric keypad. By simply pressing or releasing the Fn key of FIG. 1 with the left hand, the user can almost instantly switch between typing numbers (FIG. 2a) and navigating a document (FIG. 2b) using his/her right hand.

Figure 3:
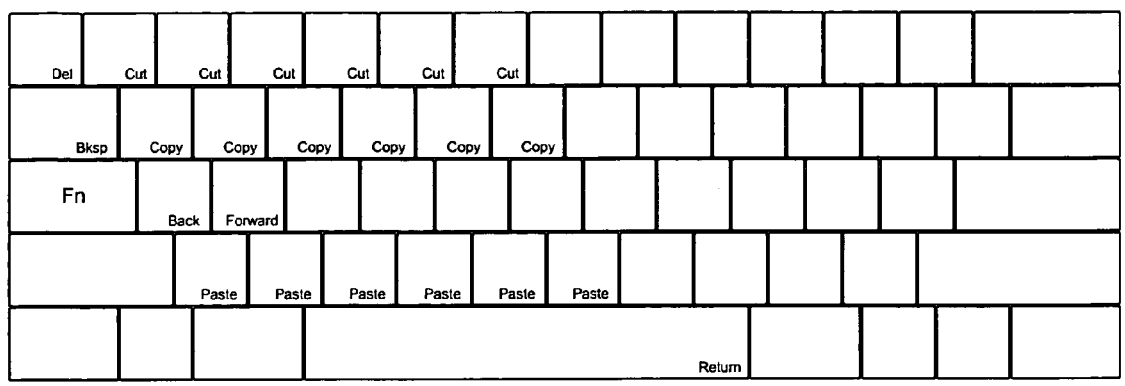
FIG. 3 shows an embodiment of the keyboard layout according to the present invention optimized for use with a mouse (or other pointing device)

FIG. 3 shows an embodiment optimized for use with a mouse (or other pointing device). Multiple Cut, Copy, and Paste keys are provided for redundancy, thereby allowing the user a greater margin of error when activating such functions, and greater flexibility as to which finger is used to press the Fn key. Back and Forward keys are also provided, for web and file-browser navigation.

Figure 4:
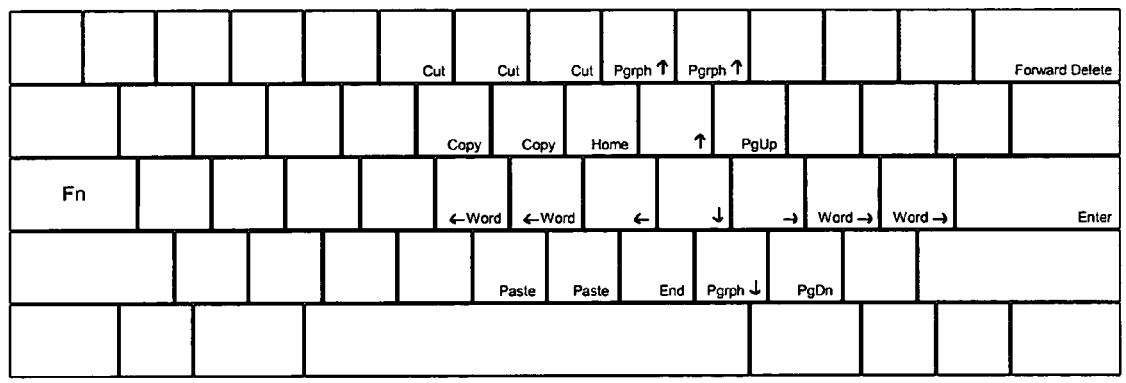
FIG. 4 shows an embodiment of the keyboard layout according to the present invention optimized for use when entering text.

FIG. 4 shows an embodiment optimized for use when entering text. Specifically, the layout of edit function keys allows the user to quickly switch between typing, document navigation, and editing, without moving his/her hands from the home row.

It should be noted that any or all of the embodiments discussed above in connection with FIGS. 1-4 may be implemented on the same keyboard.

Figure 5A:
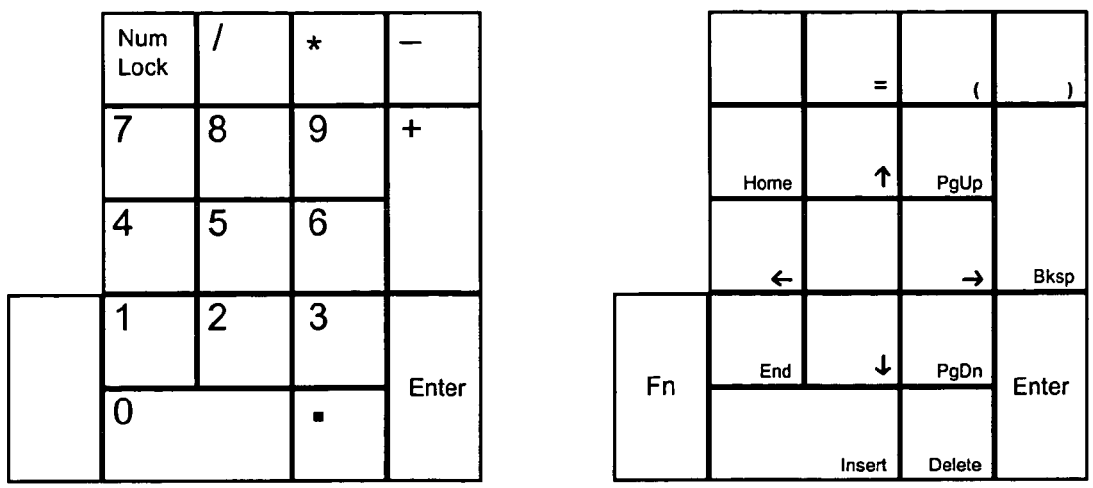
FIG. 5a shows an alternative embodiment of the keyboard layout according to the present invention optimized for use on a self-contained numeric keypad, wherein the left drawing shows the standard numeric keypad layout and the right drawing shows an alternate layout when the Fn key is active.
Figure 5B:
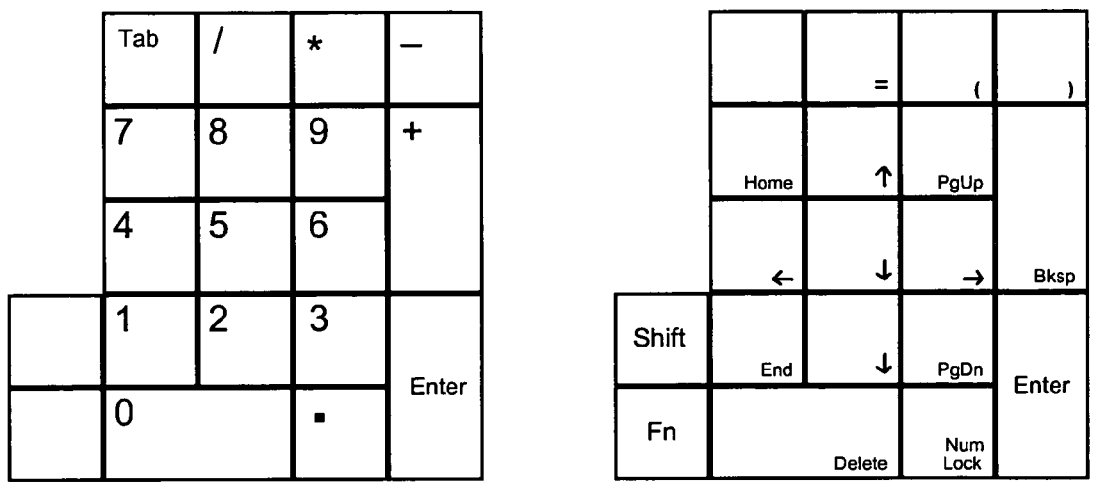
FIG. 5b shows a further alternative embodiment of the keyboard layout according to the present invention optimized for use on a self-contained numeric keypad, wherein the left drawing shows the standard numeric keypad layout and the right drawing shows an alternate layout when the Fn key is active.

FIG. 5 shows two embodiments for stand-alone numeric keypads (FIGS. 5a and 5b). In each embodiment, the Fn key is activated by the thumb of the user's right hand. Size, shape, and position of the Fn key may differ for different applications and user preferences.

Figure 6:
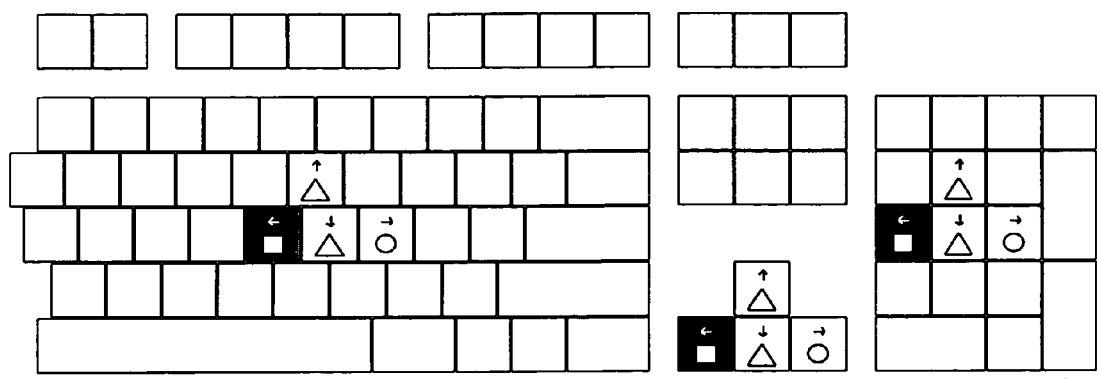
FIG. 6 shows an embodiment of the keyboard layout according to the present invention with cursor key layout for three different home positions.

In summary, the keyboard layout according to the present invention allows the users hands generally to remain in the home position for most typing tasks, thereby minimizing non-productive hand movements between home positions for various devices/tasks. Remapping of keys to other key functions are generally consistent with the home row positions for the keys being remapped to. This speeds user learning and minimizes confusion, because the user can transfer skills already acquired using the standard key positions. For example, FIG. 6 shows index, middle, and ring finger key-mappings (square, triangle, and circle, respectively) that are identical for the cursor keys in all the different positions where they can be typed. The grey boxes in FIG. 6 indicate the standard home position for the index finger in each case.

The keyboard layout of the present invention integrates well into a standard keyboard, with no costly physical changes required (for example, no additional keys are needed), and does not interfere with the standard behavior of the keyboard. When the Fn key is not activated, the keyboard functions exactly as a standard keyboard.

In the preferred embodiment, the Shift and Fn keys are located next to each other, and therefore can be pressed simultaneously using just one finger. This is a critical significant advantage because it allows the user to quickly and comfortably initiate selections, by using the Cursor and Shift keys in combination. The user can select characters, words, lines, even entire paragraphs, using this approach.

The many features and advantages of the invention are apparent from the detailed specification and, thus, it is intended by the appended claims to cover all such features and advantages of the invention that fall within the sphere and scope of the invention. Other embodiments or variations are possible within the sphere and scope of the present invention. For example, although the embodiments set forth above incorporate only a single modifier (Fn) key, additional (redundant) Fn keys may be incorporated on the keyboard. Also, whereas the embodiments set forth above show only use of the Fn key as a modifier, it is contemplated that other modifier keys may perform the function of the Fn key, provided that there is no conflict with other functions that the aforementioned modifier already performs. Moreover, numerous Fn key combinations not set forth above in connection with the preferred embodiment will be known to persons of ordinary skill in the art. These include, but are not limited to, the Expose functions in Mac OS X, volume control functions, media access keys, etc. Since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A typing keyboard for minimizing non-productive hand movements, comprising:
   a) a plurality of keys for entering alphanumeric text, said keys being positioned according to a conventional keyboard layout; and
   b) a least one modifier key positioned near a normal resting position of a user's typing fingers according to said conventional keyboard layout, for remapping predetermined ones of said plurality of keys for entering alphanumeric text to commonly-used keyboard functions that are positioned near said normal resting position of said user's typing fingers according to said conventional keyboard layout, thereby minimizing non-productive hand movements between alphanumeric text entry and said commonly-used keyboard functions, wherein said predetermined ones of said plurality of keys are positioned in home row and in rows adjacent said home row of said conventional keyboard layout, wherein said commonly-used keyboard functions include keys for editing a document and wherein the modifier key is not located in a top row of said conventional keyboard layout.

2. The typing keyboard of claim 1, wherein said modifier key is positioned between Tab and Shift keys of said conventional keyboard layout.

3. The typing keyboard according to claim 2, wherein said modifier key is activated upon being pressed and deactivated upon being released.

4. The typing keyboard of claim 1, wherein said plurality of keys forms a numeric keypad and said commonly-used keyboard functions includes keys for navigating a document.

5. The typing keyboard of claim 4, wherein said at least one modifier key is positioned near the normal resting position of the user's right thumb.

6. The typing keyboard according to claim 5, wherein said modifier key is activated upon being pressed and deactivated upon being released.

7. The typing keyboard according to claim 4, wherein said modifier key is activated upon being pressed and deactivated upon being released.

8. The typing keyboard of claim 1, wherein said commonly-used keyboard functions includes at least one of cut, copy and paste.

9. The typing keyboard of claim 8, wherein said commonly-used keyboard functions includes at least one of Back and Forward.

10. The typing keyboard of claim 8, wherein said commonly-used keyboard functions includes at least one of Pgrph↑, Home, PgUp, ←Word, Word→, Pgrph↓, End, PgDn, ←, ↑, →, ↓.

11. The typing keyboard of claim 1, wherein at least one of said commonly-used keyboard functions is assigned to multiple ones of said keys for redundancy.

12. The typing keyboard according to claim 11, wherein said modifier key is activated upon being pressed and deactivated upon being released.

13. The typing keyboard according to claim 1, wherein said modifier key is activated upon being pressed and deactivated upon being released.

14. The typing keyboard according to claim 1, wherein said modifier key is activated upon being pressed and deactivated upon being released.

* * * * *